United States Patent
Awad et al.

(10) Patent No.: US 10,934,175 B1
(45) Date of Patent: Mar. 2, 2021

(54) METHOD OF MAKING ZINC OXIDE NANOPARTICLES USING RED SAND

(71) Applicant: KING SAUD UNIVERSITY, Riyadh (SA)

(72) Inventors: Manal Ahmed Gasmelseed Awad, Riyadh (SA); Ali Kanakhir Aldalbahi, Riyadh (SA); Khalid Mustafa Osman Ortashi, Riyadh (SA); Taghrid Saad Omar Alomar, Riyadh (SA); Najla Saad Almasoud, Riyadh (SA)

(73) Assignee: King Saud University, Riyadh (SA)

( * ) Notice: Subject to any disclaimer, the term of this patent is extended or adjusted under 35 U.S.C. 154(b) by 92 days.

(21) Appl. No.: 16/701,115

(22) Filed: Dec. 2, 2019

(51) Int. Cl.
*C01G 9/02* (2006.01)
*B01J 35/00* (2006.01)
(Continued)

(52) U.S. Cl.
CPC .............. *C01G 9/02* (2013.01); *B01D 21/262* (2013.01); *B01J 23/06* (2013.01); *B01J 35/004* (2013.01); *B01J 37/009* (2013.01); *B01J 37/0236* (2013.01); *B01J 37/031* (2013.01); *B01J 37/08* (2013.01); *C02F 1/32* (2013.01); *C02F 1/725* (2013.01); *C01P 2002/85* (2013.01);
(Continued)

(58) Field of Classification Search
CPC ........ C01G 9/02; B01D 21/26; B01D 21/262; C02F 1/46; C02F 2305/08; C02F 1/725; C02F 2305/10; C02F 2101/308; B01J 35/0013; B01J 35/004; B01J 23/06; B01J 37/086; B01J 37/033; B82Y 30/00; B82Y 40/00; C01P 2002/72; C01P 2002/85; C01P 2004/04; C01P 2004/51; C01P 2004/62; C01P 2004/13; C01P 2004/24
See application file for complete search history.

(56) References Cited

U.S. PATENT DOCUMENTS 4,923,518 A  5/1990 Brand et al.
10,256,366 B2  4/2019 Myoung et al.
(Continued)

FOREIGN PATENT DOCUMENTS

CN  107175112 A  *  9/2017
CN  108355653 A     8/2018

OTHER PUBLICATIONS

CN 107175112A A translation (Year: 2017).*

(Continued)

*Primary Examiner* — Cameron J Allen
(74) *Attorney, Agent, or Firm* — Richard C. Litman; Nath, Goldberg & Meyer

(57) ABSTRACT

The method of producing zinc oxide nanoparticles (ZnO NPs) using red sand includes mixing red sand with water to form an aqueous suspension of red sand, removing the supernatant from the suspension, centrifuging the supernatant and retaining a second supernatant from the centrifuged suspension, dissolving a solution of zinc nitrate in the second supernatant to form a precursor solution, and adding 1M NaOH dropwise to the precursor solution to precipitate the zinc oxide nanoparticles. The precipitate may be washed, dried and calcined to provide the red sand synthesized ZnO NPs. The red sand synthesized ZnO NPs have photocatalytic activity and can be used, for example, to degrade organic dyes in aqueous environments.

5 Claims, 5 Drawing Sheets

(51) Int. Cl.

| | |
|---|---|
| *B01J 37/00* | (2006.01) |
| *B01J 37/03* | (2006.01) |
| *B01J 37/02* | (2006.01) |
| *B01J 37/08* | (2006.01) |
| *B01D 21/26* | (2006.01) |
| *C02F 1/32* | (2006.01) |
| *C02F 1/72* | (2006.01) |
| *B01J 23/06* | (2006.01) |
| *C02F 101/30* | (2006.01) |

(52) U.S. Cl.
CPC .... *C01P 2004/03* (2013.01); *C02F 2101/308* (2013.01); *C02F 2305/08* (2013.01); *C02F 2305/10* (2013.01)

(56) References Cited

U.S. PATENT DOCUMENTS

2009/0258156 A1* 10/2009 Chretien ............... C09D 11/50
427/532
2019/0210887 A1   7/2019 Qureshi et al.

OTHER PUBLICATIONS

Baruah et al., "pH-dependent growth of zinc oxide nanorods," Journal of Crystal Growth, 311.8 (2009): 2549-2554.

Rekha et al., "Structural, optical, photocatalytic and antibacterial activity of zinc oxide and manganese doped zinc oxide nanoparticles," Physica B: Condensed Matter, 405.15 (2010): 3180-3185.

Nair et al., "Structural, optical, photo catalytic and antibacterial activity of ZnO and Co doped ZnO nanoparticles," Materials Letters, 65.12 (2011): 1797-1800.

Azmina et al., "Enhanced photocatalytic activity of ZnO nanoparticles grown on porous silica microparticles," Applied Nanoscience, 7.8 (2017): 885-892.

Agarwal et al., "A review on green synthesis of zinc oxide nanoparticles—An eco-friendly approach," Resource-Efficient Technologies, 3.4 (2017): 406-413.

Shriwas, S., Ashtapture, Aparnadeshdende, SonaliMarathe, Mewanrhede, Jaya shree chimanpure, RewuPasricha, Jurban, Haram, S. K., Gosavi, S. W. & Kurkarni, S. K. (2005). Synthesis and Analysis of ZnO and CdSe nanoparticles. Pramana—journal of Physics. Indian academy of science, 65(4).pp. 615-620.

Singh, D. K., Pandey, D. K., Yadav, R. R. & Devraj, S. (2012). A Study of nanosized zinc oxide and its nanofluid, Pramana—journal of physics, 78, DOI: 10.1007/s12043-012-0275-8,p. 759-766.

Layek, A., Manna, B., & Chowdhury, A. (2012). Carrier recombination dynamics through defect states of ZnO nanocrystals: From nanoparticles to nanorods. Chemical Physics Letters, 539, 133-138.

Misnon, N. A., Jaafar, M. S., Alhozaimy, A., & Hassan, A. A. CBIT40 Microstructural Study of Red Sand used as Partial Cement Replacement.

Kołodziejczak-Radzimska, A., & Jesionowski, T. (2014). Zinc oxide—from synthesis to application: a review. Materials, 7(4), 2833-2881.

Yedurkar, M. S., Punjabi, D. K., Maurya, B. C., & Mahanwar, A. P. (2018). Biosynthesis of Zinc Oxide Nanoparticles using Euphorbia Milii Leaf Extract—A Green Approach. Materials Today: Proceedings, 5(10), 22561-22569.

Sabir et al., "Zinc Oxide Nanoparticles for Revolutionizing Agriculture: Synthesis and Applications", The Scientific World Journal (2014), vol. 2014, Article ID 925494, 8 pages.

* cited by examiner

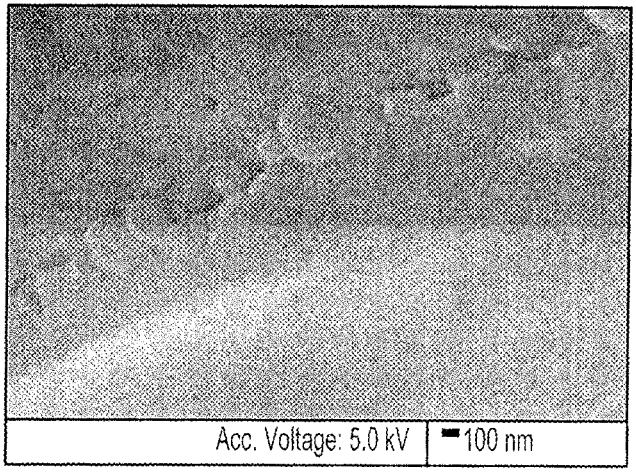
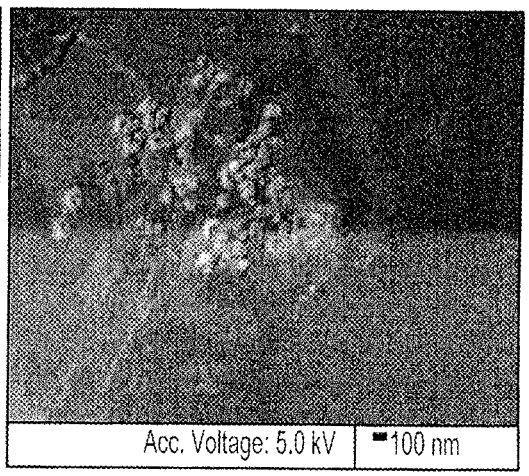
FIG. 6A      FIG. 6B
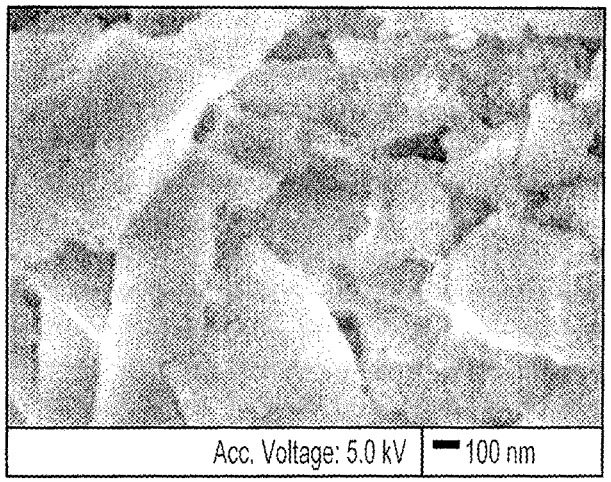
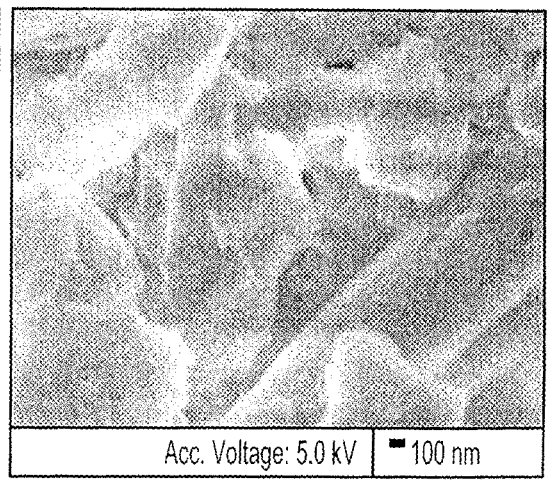
FIG. 6C      FIG. 6D

METHOD OF MAKING ZINC OXIDE NANOPARTICLES USING RED SAND

BACKGROUND

1. Field

The disclosure of the present patent application relates to zinc oxide nanoparticles, and particularly to a method of making zinc oxide nanoparticles using red sand and use of the nanoparticles as a photocatalyst.

2. Description of the Related Art

Nanoscale semiconductor particles possess special properties over corresponding bulk or molecular materials, including large surface-to-volume ratio, increased activity, controllable electronic properties and unexpected optical properties. Zinc oxide (ZnO) is a semiconductor with potentially useful properties of a wide direct band gap of 3.3 eV at room temperature, a high exciton bonding energy of 60 meV, transparency to visible light, high electron mobility, and significant luminescence at room temperature. ZnO is widely used in a number of applications, including varistors, UV lasers, gas sensors, photoprinting, electrochemical nanodevices, sunscreen lotions, cosmetics, and medicated creams.

ZnO nanoscale particles, i.e., nanoparticles (NP), could advantageously combine the properties of nanoscale particles with the physical properties of ZnO, but conventional methods for nanosynthesis of ZnO NPs is expensive, and entail the use and waste output of chemicals with potentially adverse environmental and public health effects.

Alternative methods of making zinc oxide nanoparticles using natural and abundant resources that avoid the use or output of harmful chemicals are therefore desired.

Thus, a method of making zinc oxide nanoparticles using red sand solving the aforementioned problems is desired.

SUMMARY

The method of producing zinc oxide nanoparticles (ZnO NPs) using red sand includes mixing red sand with water to form an aqueous suspension of red sand, removing the supernatant from the suspension, centrifuging the supernatant and retaining a second supernatant from the centrifuged suspension, dissolving a solution of zinc nitrate in the second supernatant to form a precursor solution, and adding 1M NaOH dropwise to the precursor solution to precipitate the zinc oxide nanoparticles. The precipitate may be washed, dried and calcined to provide the red sand synthesized ZnO NPs.

The red sand synthesized ZnO NPs have photocatalytic activity and can be used, for example, to degrade organic dyes in aqueous environments. These and other features of the present disclosure will become readily apparent upon further review of the following specification and drawings.

BRIEF DESCRIPTION OF THE DRAWINGS

FIGS. 6A, 6B, 6C, and 6D are scanning electron microscope (SEM) micrographs of zinc oxide nanoparticles made using red sand at various magnifications.

Similar reference characters denote corresponding features consistently throughout the attached drawings.

DETAILED DESCRIPTION OF THE PREFERRED EMBODIMENTS

Figure 1:
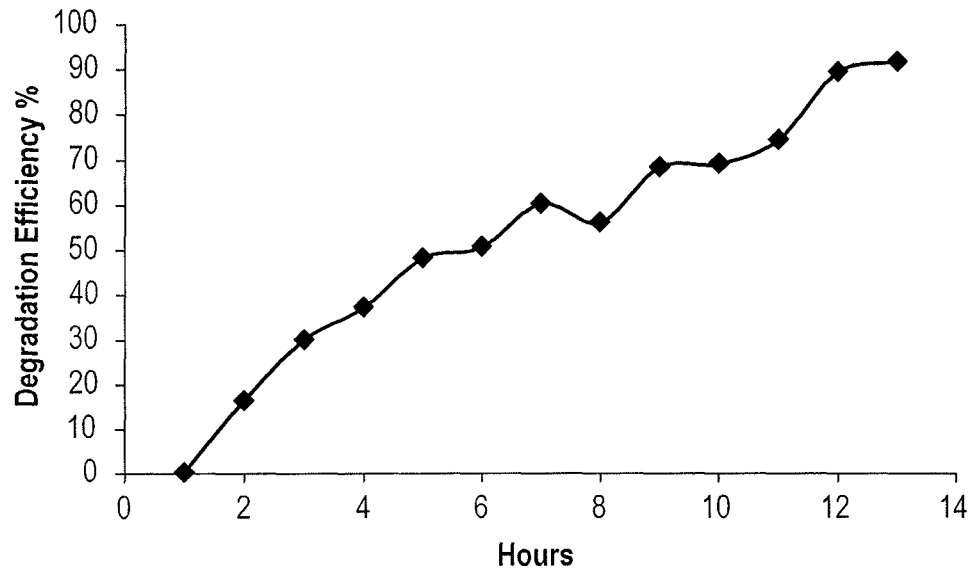
FIG. 1 is a plot of Eosin dye degradation efficiency under UV irradiation using zinc oxide nanoparticles made using red sand as a photocatalyst.

The method of producing zinc oxide nanoparticles (ZnO NPs) using red sand includes mixing red sand with water to form an aqueous suspension of red sand, removing the supernatant from the suspension, centrifuging the supernatant and retaining a second supernatant from the centrifuged suspension, dissolving a solution of zinc nitrate in the second supernatant to form a precursor solution, and adding 1M NaOH dropwise to the precursor solution to precipitate the zinc oxide nanoparticles. The aqueous suspension of red sand may be formed by allowing the red sand to soak in the water, allowing the red sand to settle or otherwise separating the red sand from the water (for example, by centrifugation) in which it soaked and removing the resulting supernatant. The red sand may soak in the water for 12 hours, for example. The zinc nitrate may be zinc nitrate hexahydrate. The NaOH may be added slowly, for example, dropwise under stirring conditions. The precipitate is typically brown in color and may be washed, dried and calcined to provide the red sand synthesized ZnO NPs.

The red sand synthesized ZnO NPs have photocatalytic activity and can be used, for example, to degrade organic dyes in aqueous environments. In particular, the red sand synthesized ZnO NPs were prepared in the following examples according to an embodiment of the presently disclosed method and shown to be an effective catalyst for degrading crystal violet (CV) and Eosin dyes.

The present method of synthesizing zinc oxide nanoparticles provides zinc oxide nanoparticles with predictable properties and in scalable quantities. The zinc oxide nanoparticles include crystalline zinc oxide and can have a typical size between 105-180 nm, with an average size of around 143.5 nm. The zinc oxide nanoparticle morphologies can vary, ranging from nearly spherical to irregular or spongy in shape. The zinc oxide nanoparticles may have high purity. The method for producing zinc oxide nanoparticles can be useful in many fields, such as controlled release applications, sensor devices, electronics, catalysis, dielectric materials and photocatalytic applications, particularly in the context of water treatments. As red sand is an abundant resource, particularly in arid lands, the present methods are particularly desirable for synthesizing zinc oxide nanoparticles.

It should be understood that the amounts of materials for the methods described herein are exemplary, and appropriate scaling of the amounts are encompassed by the present subject matter, so long as the relative ratios of materials are maintained. As used herein, the term "about," when used to modify a numerical value, means within ten percent of that numerical value. Sand is generally formed from very small pieces of rock. Red sand comprises chemical compounds compositions such as: Silica (Si), Oxygen (O), Nitrogen (N), Aluminum (Al), Carbon (C), Potassium (K), Calcium (Ca) and Iron (Fe). The specific composition of sand depends on local mineral sources and geological conditions. The present method is illustrated by the following examples.

Example 1

Zinc Oxide Nanoparticle Synthesis

Red sand was obtained from a local area in Khozama, Riyadh. 250 g of the red sand was added to 300 ml boiling distilled water, mixed well by stirring for 3-5 minutes and allowed to soak for 12 hours. After allowing the sand to settle, the supernatant was collected and centrifuged at 5000 rpm for 10 min. The resulting second supernatant was removed and taken used in the following steps.

About 0.5 M (4.734 g) zinc nitrate hexahydrate was dissolved in 50 ml of the suspension (second supernatant) of red sand. Then, 10 mL of 1.0 M NaOH was added dropwise under magnetic stirring at 80° C. After the addition was completed, stirring was continued for 40 min, by which time a light brown precipitate was visible. The light brown precipitate contained ZnO nanoparticles, which were collected by centrifugation and washed with pure (deionized) water. The washed precipitate so obtained was dried at 60° C. for 24 hours and the dried powder was calcined at 200° C. for 2 hours, resulting in the exemplary red sand synthesized ZnO NPs. Calcination generated red sand synthesized ZnO NPs with greater purity, more uniform size and increased crystal formation of the red sand synthesized ZnO NPs.

Example 2

Zinc Oxide Nanoparticle Characterization

The crystalline and phase structure of the red sand synthesized ZnO NPs was studied by an X-ray diffractometer (XRD, D8-Advance, Bruker, CuKα radiation). The particle size distribution was measured by a laser light scattering technique (Zeta sizer, Malvern Instruments). Morphology, particle size and specific surface area of the ZnO nanoparticles were studied by SEM. The optical properties were studied via UV irradiation and photoluminescence PL.

Figure 3:
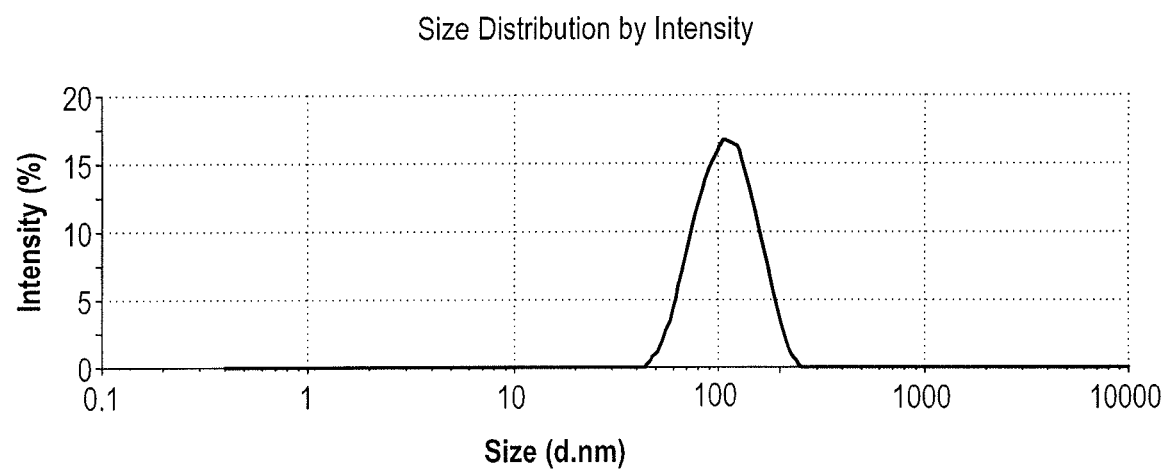
FIG. 3 is a plot of zeta sizer measurement results of the average size of zinc oxide nanoparticles made using red sand.
Figure 4:
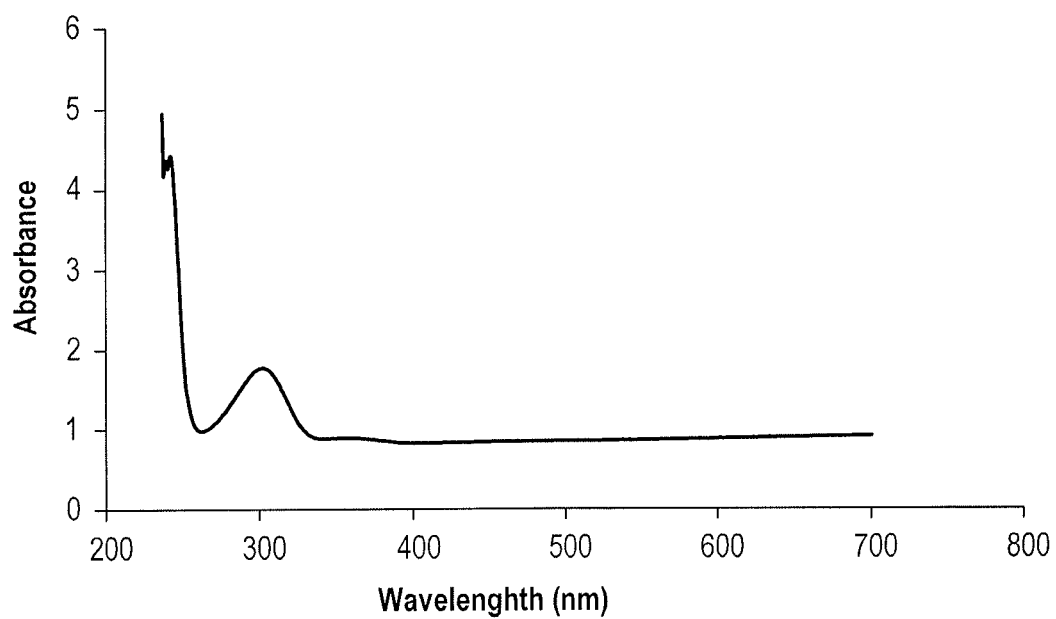
FIG. 4 is a UV-Vis spectrum of zinc oxide nanoparticles made using red sand.

Dynamic light scattering (DLS) was used to determine the particle size distribution of the red sand synthesized ZnO NPs. The average size of the red sand synthesized ZnO NPs was measured to be 143.5 nm, and the polydispersity index (PDI) was 0.3, which indicates a polydispersed size distribution (FIG. 3). The UV-Vis absorption spectrum of the red sand synthesized ZnO NPs was measured, as shown in FIG. 4. The spectrum shows an absorbance peak at 303 nm.

Figure 5:
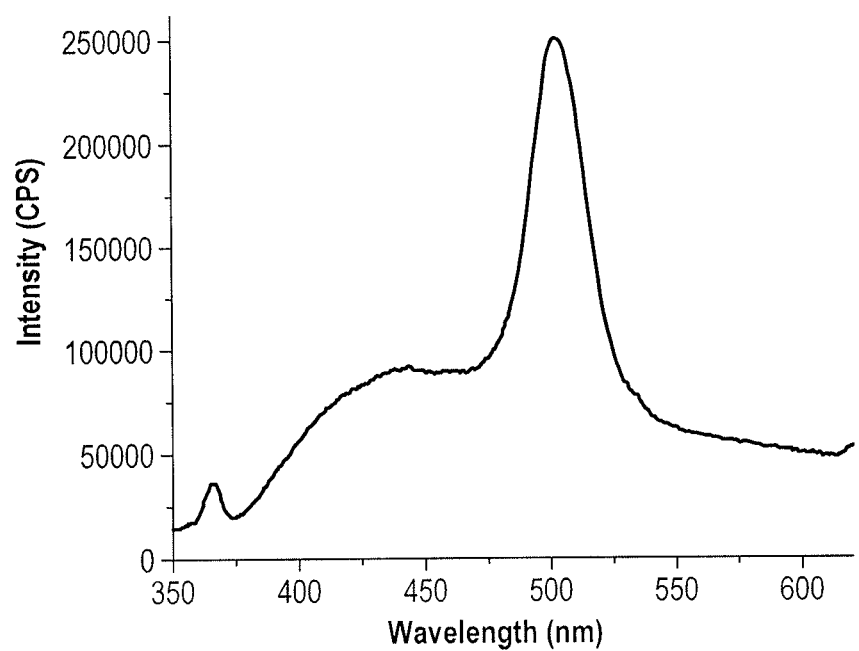
FIG. 5 is a photoluminescence spectrum of zinc oxide nanoparticles made using red sand.

The Photoluminescence (PL) spectrum of the exemplary red sand synthesized ZnO NPs is shown in FIG. 5. The emission spectrum shows a sharp peak in the visible region and a sharp band in the UV region (FIG. 5). The visible emission peak could be due to defect emissions arising from surface related defects (dangling bonds, hydroxyl groups), extrinsic impurities, or intrinsic defects (such as oxygen vacancy, zinc vacancy etc.) Defect emissions show great promise in such applications as sensing, catalysis, and biological applications.

Scanning Electron Microscope (SEM) analysis of the exemplary red sand synthesized ZnO NPs is depicted in FIGS. 6A-6D. The nanoparticles appear with spherical, irregular, and spongy morphologies.

Figure 7A:
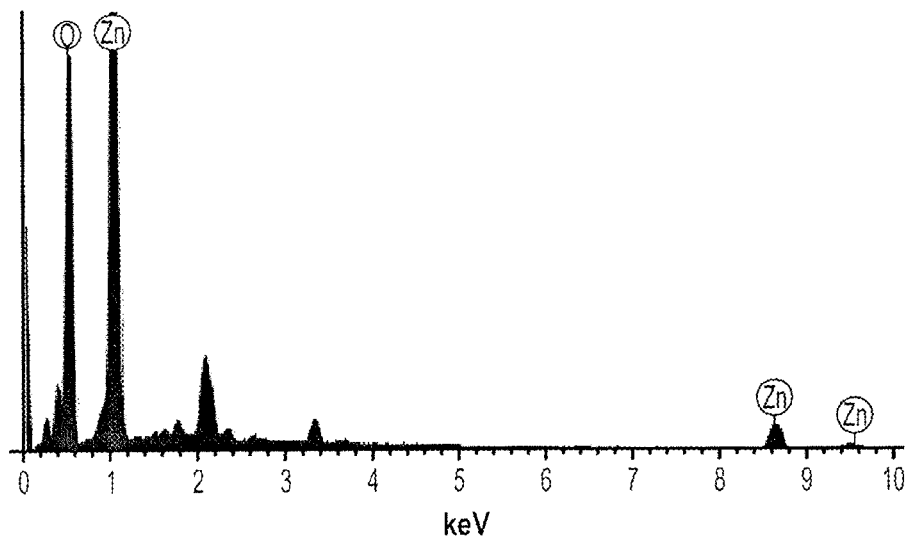
FIG. 7A is an Energy-dispersive X-ray spectroscopy (EDS) spectrum of zinc oxide nanoparticles made using red sand.
Figure 7B:
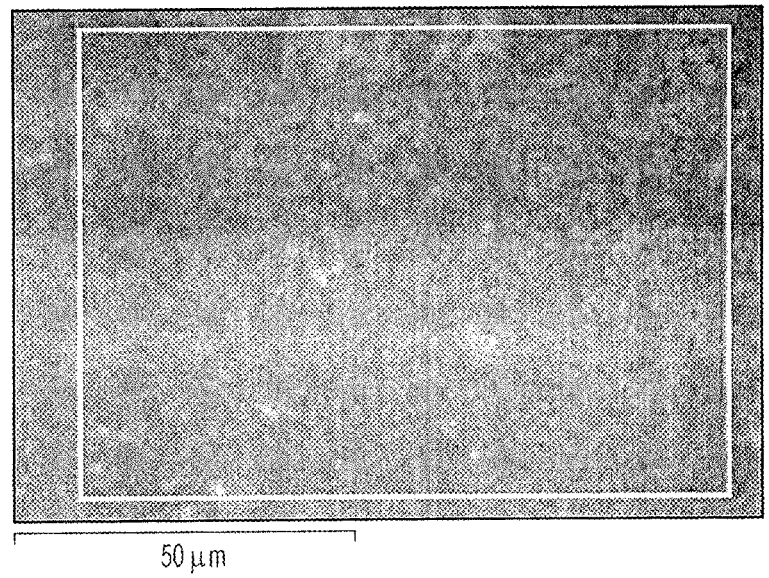
FIG. 7B is the SEM mapping micrograph corresponding to the EDS spectrum of FIG. 7A.

Energy Dispersive Spectrometry (EDS) analysis was performed for the red sand synthesized ZnO NPs to confirm elemental composition. EDS shows the characteristic signals of zinc and oxygen in the red sand synthesized ZnO NPs, as shown in FIG. 7A. The elemental analysis shows the exemplary red sand synthesized ZnO NPs as prepared are composed primarily of Zn and O.

Example 3

Use of Zinc Oxide NPs for Photocatalytic Degradation of Organic Dyes

Photocatalytic activity of the red sand synthesized ZnO NPs was evaluated under UV irradiation with respect to crystal violet (CV) and Eosin dyes in an aqueous solution. CV and Eosin dye solutions were prepared by dissolving 1 mg of CV or Eosin dye in 100 ml distilled water, each, and mixed by a magnetic stirrer at room temperature at 800 rpm for 5 minutes. Then, 30 ml of CV or Eosin dye solution was added to a laboratory-scale cuvette and the photocatalyst sample was dispersed inside the cuvette facing a UV lamp irradiating the sample with UV light. Optical absorption spectra were recorded upon different light exposure durations using a UV/Vis spectrophotometer in order to monitor the rate of degradation by recording the reduction in absorption intensity of each dye at the maximum wavelength. The degradation efficiency (DE) was calculated as:

$$DE\% = (A_0 - A)/A_0 \times 100,$$

where $A_0$ is the initial absorption and $A$ is the absorption intensity after photodegradation.

Figure 2:
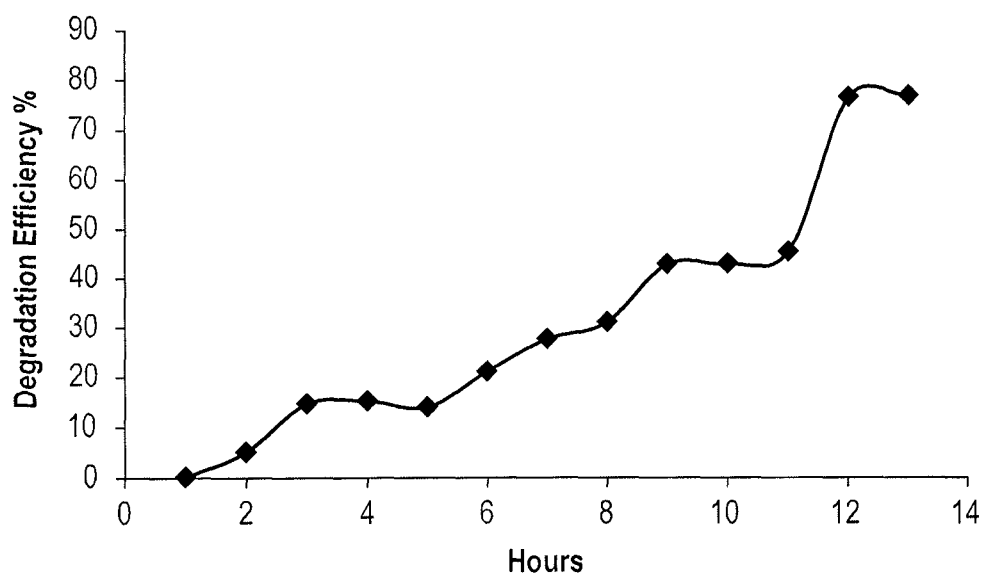
FIG. 2 is a plot of crystal violet (CV) dye degradation efficiency under UV irradiation using zinc oxide nanoparticles made using red sand as a photocatalyst.

The photocatalytic activity of red sand synthesized ZnO NPs under UV irradiation degraded about 92% of the Eosin dye after 66 hours (FIG. 1) and about 80% of the CV dye after 66 hours (FIG. 2). The ZnO NPs synthesized using the red sand suspension show degradation efficiency sufficient for use in a wide range of photocatalytic applications, such as in water treatments.

It is to be understood that the method of making zinc oxide nanoparticles using red sand is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making zinc oxide nanoparticles using red sand, comprising the steps of:
   mixing red sand with water to form an aqueous suspension of red sand, wherein the red sand is from an area in Riyadh, Saudi Arabia;
   allowing the aqueous suspension of red sand to equilibrate at least overnight;
   removing a first supernatant from the equilibrated aqueous suspension of red sand;
   centrifuging the first supernatant;
   removing a second supernatant from the centrifuged first supernatant, the second supernatant defining a suspension of red sand;

dissolving a zinc precursor in the suspension of red sand to initiate precipitation of nanoparticles of zinc oxide;
adding NaOH dropwise to the suspension to complete precipitation of the nanoparticles of zinc oxide;
isolating the precipitate; and
drying and calcining the isolated precipitate to obtain the zinc oxide nanoparticles.

2. The method of making zinc oxide nanoparticles according to claim 1, wherein the step of mixing red sand with water comprises adding the red sand to boiling distilled water with stirring.

3. The method of making zinc oxide nanoparticles according to claim 1, wherein the step of drying and calcining comprises drying at about 60° C. to obtain a dried powder and calcining the dried powder at about 200° C.

4. The method of making zinc oxide nanoparticles according to claim 1, wherein the nanoparticles have a size of between 105-180 nm.

5. The method of making zinc oxide nanoparticles according to claim 4, wherein the nanoparticles have an average size of 143.5 nm.

\* \* \* \* \*